United States Patent
Lee et al.

(10) Patent No.: US 8,326,004 B2
(45) Date of Patent: Dec. 4, 2012

(54) FINGERPRINT RECOGNITION DEVICE AND USER AUTHENTICATION METHOD FOR CARD INCLUDING THE FINGERPRINT RECOGNITION DEVICE

(75) Inventors: Do-Young Lee, Seongnam-si (KR); Byoung-Su Lee, Yeosu-si (KR)

(73) Assignee: Siliconfile Technologies Inc., Seoul (KR)

( * ) Notice: Subject to any disclaimer, the term of this patent is extended or adjusted under 35 U.S.C. 154(b) by 555 days.

(21) Appl. No.: 12/528,603

(22) PCT Filed: Mar. 10, 2008

(86) PCT No.: PCT/KR2008/001331
§ 371 (c)(1),
(2), (4) Date: Aug. 25, 2009

(87) PCT Pub. No.: WO2008/114946
PCT Pub. Date: Sep. 25, 2008

(65) Prior Publication Data
US 2010/0118131 A1    May 13, 2010

(30) Foreign Application Priority Data
Mar. 19, 2007    (KR) .................. 10-2007-0026463

(51) Int. Cl.
*G06K 9/00*    (2006.01)
(52) U.S. Cl. ...................... 382/125; 382/115
(58) Field of Classification Search .............. 348/77; 235/492; 382/115, 124, 125; 438/126; 310/314; 713/172
See application file for complete search history.

(56) References Cited

U.S. PATENT DOCUMENTS

| | | | |
|---|---|---|---|
| 5,239,166 A | 8/1993 | Graves | |
| 2002/0053857 A1* | 5/2002 | Scott et al. | 310/314 |
| 2005/0259850 A1* | 11/2005 | Shimamura et al. | 382/124 |
| 2006/0097059 A1* | 5/2006 | Miyazaki | 235/492 |
| 2006/0115128 A1* | 6/2006 | Mainguet | 382/115 |
| 2007/0122013 A1* | 5/2007 | Setlak et al. | 382/124 |
| 2008/0096326 A1* | 4/2008 | Reed | 438/126 |
| 2009/0100265 A1* | 4/2009 | Tadokoro | 713/172 |
| 2009/0123038 A1* | 5/2009 | Tissot et al. | 382/124 |
| 2009/0226052 A1* | 9/2009 | Fedele et al. | 382/125 |
| 2010/0118131 A1* | 5/2010 | Lee et al. | 348/77 |

FOREIGN PATENT DOCUMENTS
JP    60-072067    4/1985
(Continued)

OTHER PUBLICATIONS
PCT International Search Report of PCT/KR2008/001331 filed on Mar. 10, 2008.
(Continued)

*Primary Examiner* — Le H Luu
(74) *Attorney, Agent, or Firm* — Kile Park Goekjian Reed & McManus PLLC

(57) ABSTRACT

Provided are a fingerprint recognition device which performs a fingerprint recognition function and can be inserted into a card, the card including the fingerprint recognition device, and a user authentication method for the card including the fingerprint recognition device. The fingerprint recognition device includes a fingerprint touch unit that a fingerprint touches and an image sensor capturing a fingerprint pattern by using a reflected wave reflected from the fingerprint touch unit 310 and comparing a comparison reference fingerprint pattern with the captured fingerprint pattern.

8 Claims, 4 Drawing Sheets

FOREIGN PATENT DOCUMENTS

| | | |
|---|---|---|
| JP | 11-123186 A | 5/1999 |
| JP | 2000-57324 A | 2/2000 |
| JP | 2002-298119 | 10/2002 |
| JP | 2002-298119 A | 10/2002 |
| JP | 2003-177013 A | 6/2003 |
| JP | 2004-19140 A | 1/2004 |
| JP | 2004-173827 A | 6/2004 |
| JP | 2005-110896 A | 4/2005 |
| JP | 2005-310157 A | 11/2005 |
| KR | 1020060047255 A | 5/2006 |

OTHER PUBLICATIONS

PCT Written Opinion of the International Search Authority for PCT/KR2008/001331 filed on Mar. 10, 2008.

* cited by examiner

FIG. 1     Conventional Pressure Sensor
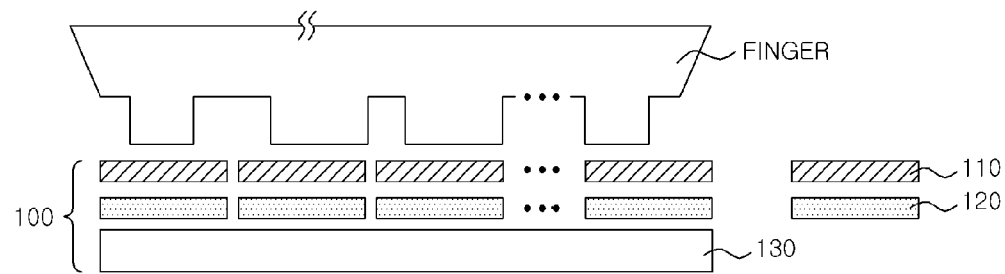
FIG. 2     Conventional Optical Image Sensor
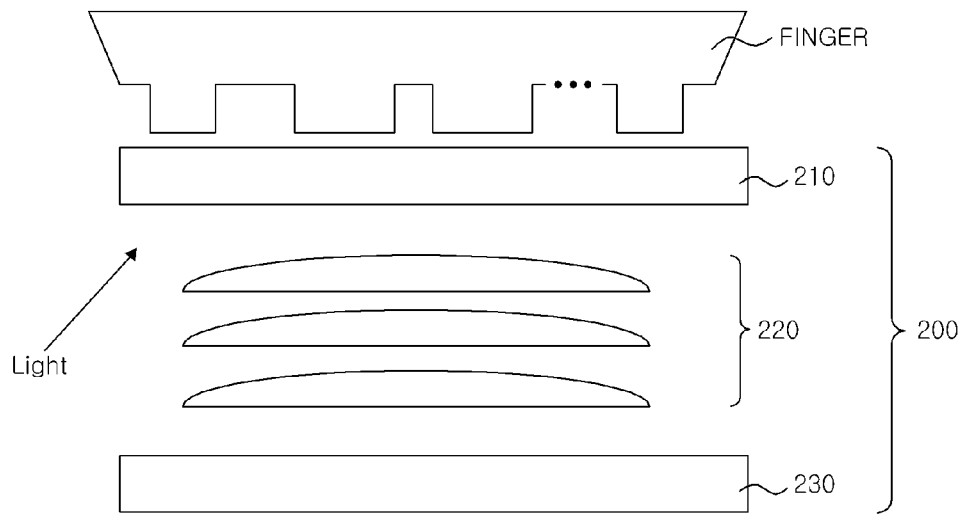

FINGERPRINT RECOGNITION DEVICE AND USER AUTHENTICATION METHOD FOR CARD INCLUDING THE FINGERPRINT RECOGNITION DEVICE

BACKGROUND OF THE INVENTION

1. Field of the Invention

The present invention relates to a fingerprint recognition device, and more particularly, to a fingerprint authentication device which can be inserted into a card to authenticate a card user.

2. Description of the Related Art

As information technologies have been developed and e-commerce grows, there is an increasing need for accurate user authentication. In order for a machine to identify a person, identifications (IDs), passwords, resident registration numbers, names, and the like are widely used. Currently, biometrics has been widely applied. However, information such as the IDs, passwords, resident registration numbers, and the like can be exposed in real life easily stolen. Therefore, it is concluded that a bodily feature which is determined as the most difficult thing to be reproduced is the most reliable authentication means in the information age.

A fingerprint forms ridges with sweat glands. Fingerprints differ and do not change through life. This is why a fingerprint is printed onto a resident registration card. A fingerprint authentication system refers to a technology for identifying and authenticating a person using a fingerprint that the person has from birth through a fingerprint recognition device or system, and the fingerprint authentication system has a very high security. The fingerprint authentication system is applied to biometrics and can be implemented at low cost as compared with other authentication systems using other body portions excluding the fingerprint, so that the fingerprint authentication system has been widely used for identification and authentication technologies.

The fingerprint recognition device or the fingerprint recognition system that has been widely used in people's lives includes 2D fingerprint recognition and 3D fingerprint recognition. The 2D fingerprint recognition is generally used and can be implemented at very low cost. However, there is a problem in that the authentication can be performed by only using a picture of a fingerprint. The 3D fingerprint authentication further uses depths of a valley and a ridge of a fingerprint as a recognition factor and has high accuracy.

A first step of fingerprint recognition is capturing a fingerprint. In order to sense a shape of the fingerprint, a pressure sensor or an optical image sensor is generally used.

FIG. 1 illustrates a conventional pressure sensor used to sense a shape of a fingerprint.

Referring to FIG. 1, a pressure sensor 100 includes a plurality of pixels 110 provided to touch a finger having a fingerprint to be recognized, a plurality of capacitors 120 having terminals connected to the respective pixels 110, and a sense circuit 130 connected to the other terminals of the plurality of capacitors 120. Pressures exerted on a plurality of the pixels 110 are different according to depths of a valley and a ridge of a fingerprint. According to touch pressures, capacitances of the capacitors 120 corresponding to the pixels 110 are changed. The sense circuit 130 connected to the other terminals of the plurality of the capacitors 120 scans changes in a capacitance of a corresponding capacitor 120 and generates a shape of a fingerprint touching the fingerprint recognition device 100 as data.

The pressure sensor 100 illustrated in FIG. 1 has advances of a small size and low manufacturing costs. However, when a finger touches the pressure sensor 100, pressures exerted on the pressure sensor 100 from the finger even by the same person differ whenever touching the pressure sensor. Particularly, in order to consider too strong or too weak pressures, a proper area of a pixel and a capacitance of a corresponding capacitor have to be controlled. Since controlling the area of the pixel and the capacitance of the corresponding capacitor in consideration of the aforementioned situations is technologically difficult, a fingerprint recognition performance of the pressure sensor 100 that has been currently used is not good.

FIG. 2 illustrates a conventional optical image sensor used to sense a shape of a fingerprint.

Referring to FIG. 2, the optical image sensor 200 includes a silicon touch unit 210, a condenser lens 220, and an image sensor 230. The silicon touch unit 210 is implemented by using a material that remembers a shape according to depths of a valley and a ridge of a fingerprint for a predetermined time after the fingerprint leaves the silicon touch units 210. The condenser lens 220 transmits a reflected wave that is a light incident onto the remembered shape of the fingerprint and reflects to the image sensor 230. A resolution of the fingerprint recognized through the optical image sensor 200 illustrated in FIG. 2 is very higher than that of a fingerprint recognized by using the pressure sensor 100 illustrated in FIG. 1. However, as it can be seen through vertical structures illustrated in FIGS. 1 and 2, a size of the optical image sensor 200 illustrated in FIG. 2 is very large and manufacturing costs consumed to implement the optical image sensor 200 are relatively high.

A credit card that has been widely used authenticates an ID of a card user through a password. In this case, the password has to be stored by a bank or a credit information company, and this information always has a possibility of leakage. Therefore, if there is a credit card having the aforementioned fingerprint recognition function, without using a password that can be leaked and so the user may be damaged, the ID of the card user can be checked.

In order to realize the method, the credit card having the fingerprint recognition function is needed. However, the pressure sensor illustrated in FIG. 1 has a problem with the fingerprint recognition performance, and the optical image sensor illustrated in FIG. 2 has a large size and cannot be inserted into the credit card.

SUMMARY OF THE INVENTION

The present invention provides a fingerprint recognition device which performs a fingerprint recognition function and can be inserted into a card.

The present invention also provides a card including a fingerprint recognition device performing a fingerprint recognition function.

The present invention also provides a user authentication method for a card including a fingerprint recognition device, capable of authenticating an identification (ID) of a card user using the card including the fingerprint recognition device.

According to an aspect of the present invention, there is provided a fingerprint recognition device including: a fingerprint touch unit that a fingerprint touches; and an image sensor capturing a fingerprint pattern by using a reflected wave reflected from the fingerprint touch unit and comparing a comparison reference fingerprint pattern with the captured fingerprint pattern, wherein the fingerprint touch unit and the image sensor are implemented on different surfaces of a semiconductor substrate.

According to another aspect of the present invention, there is provided a fingerprint recognition device including: a fingerprint touch unit that a fingerprint touches; a light emitting unit emitting infrared light; and an image sensor capturing a fingerprint pattern by using an infrared reflected wave reflected from the fingerprint touch unit and comparing a comparison reference fingerprint pattern with the captured fingerprint pattern, wherein the fingerprint touch unit and the image sensor adjacent to infrared light-emitting diodes are implemented on different surfaces of a semiconductor substrate.

According to another aspect of the present invention, there is provided a card including a fingerprint recognition device includes the fingerprint recognition device which stores a comparison reference fingerprint pattern that is a fingerprint pattern of a card user in advance, captures a fingerprint input to the card, and determines whether or not the stored fingerprint pattern and the captured fingerprint pattern have the same pattern.

According to another aspect of the present invention, there is provided a user authentication method for a card including a fingerprint recognition device, including steps of inserting the card including the fingerprint recognition device into a card terminal connected to a card company or a bank on-line, capturing a fingerprint pattern input from the card, and comparing the captured fingerprint pattern with a comparison reference fingerprint pattern that is a fingerprint pattern of the card user.

BRIEF DESCRIPTION OF THE DRAWINGS

FIG. 1 illustrates a conventional pressure sensor used to sense a shape of a fingerprint.

FIG. 2 illustrates a conventional optical image sensor used to sense a shape of a fingerprint.

DETAILED DESCRIPTION OF PREFERRED EMBODIMENTS

Hereinafter, exemplary embodiments of the present invention will be described in detail with reference to the attached drawings.

Figure 3:
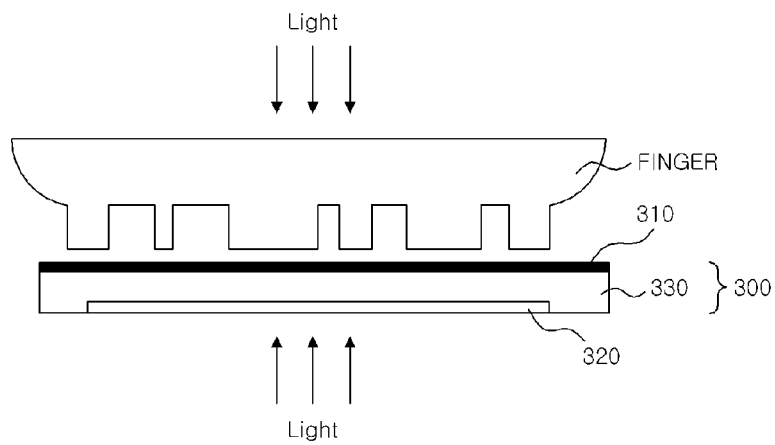
FIG. 3 illustrates a fingerprint recognition device using an external light source according to an embodiment of the present invention.

FIG. 3 illustrates a fingerprint recognition device using an external light source according to an embodiment of the present invention.

Referring to FIG. 3, the fingerprint recognition device 300 includes a fingerprint touch unit 310 and an image sensor 320.

The fingerprint touch unit 310 is implemented at a surface of a semiconductor substrate 330, which is grinded, and is a portion that a fingerprint to be recognized touches. The image sensor 320 is implemented at the other surface of the semiconductor substrate 330 on which the fingerprint tough unit 310 is implemented and has functions of capturing a shape of the fingerprint and comparing a comparison reference fingerprint pattern with the captured fingerprint pattern. The comparison reference fingerprint pattern and the captured fingerprint pattern are described later with reference to FIG. 4.

The last step of processing a wafer in which semiconductor circuits are integrated generally is grinding a surface opposite to a surface where the circuits are integrated. This is because a predetermined bias voltage has to be applied to a semiconductor circuit substrate and a series resistor reduces as a thickness of the substrate decreases. According to the embodiment present invention, a thickness of a wafer in which the image sensor 320 is implemented is decreased as much as possible and a finger is touched on a surface opposite to a surface where the image sensor 320 is implemented. If a wafer that is grinded to have a thickness of about 200 to 300 μm is used, fingerprint recognition according to the present invention can be properly performed.

Here, the fingerprint touch unit 310 is displayed by a thick line to distinguish between the fingerprint touch unit 310, the substrate 330, and the image sensor 320. In some cases, in order to improve characteristics of the fingerprint touch unit 310, an insulating material such as an oxide layer or a conductive layer may be coated.

In order to obtain a reflected wave or a refracted wave for recognizing a shape of a fingerprint, light having a predetermined frequency range is emitted in a direction from the fingerprint touch unit 310 (referred to as an upper portion in FIG. 3) or from the image sensor 320 (referred to as a lower portion in FIG. 3). When a light source (not shown) for emitting light toward the fingerprint touch unit 310 exists, light passing through the finger and the fingerprint touch unit 310 forms a reflected wave and a refracted wave according to depths of a valley and a ridge of the fingerprint. When a light source (not shown) for emitting light toward the image sensor 320 exists, light passing through the image sensor 320 and the fingerprint touch unit 310 forms a reflected wave and a retracted wave according to the depths of the valley and the ridge of the fingerprint.

The image sensor 320 receives the reflected wave and captures a shape of the fingerprint.

Figure 4:
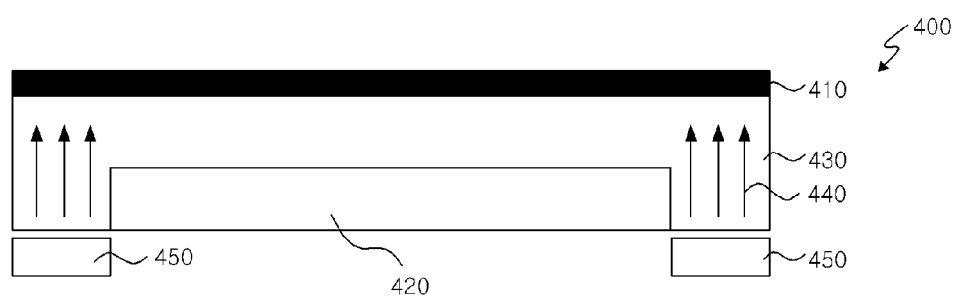
FIG. 4 illustrates a fingerprint recognition device including a light source according to an embodiment of the present invention.

FIG. 4 illustrates a fingerprint recognition device including a light source according to an embodiment of the present invention.

Referring to FIG. 4, the fingerprint recognition device includes a fingerprint touch unit 410, an image sensor 420, and a light emitting unit 450.

The fingerprint touch unit 410 is implemented on a surface of a semiconductor substrate 430, which is grinded and is a portion that a fingerprint to be recognized touches. The image sensor 420 is implemented on the other surface of the semiconductor substrate 430 opposite to the surface on which the fingerprint touch unit 410 is implemented and has functions of capturing a shape of the fingerprint and comparing a comparison reference fingerprint pattern with the captured fingerprint pattern. The light emitting unit 450 is formed at side surfaces of the image sensor 420.

In order to prevent light emitted from the light emitting unit 450 from being directly incident on the image sensor 420, a blocking layer (not shown) may be provided between the image sensor 420 and the light emitting unit 450. The light emitting unit 450 may be implemented in a method in which a plurality of light-emitting diodes (LEDs) are attached to the side surfaces of the image sensor 420. Light 440 emitted from the light emitting unit 450 is incident on the fingerprint touch unit 410 and forms a reflected wave and a refracted wave according to depths of a valley and a ridge of the fingerprint. The image sensor 420 receives the reflected wave or the refracted wave and captures a shape of the fingerprint.

Figure 5:
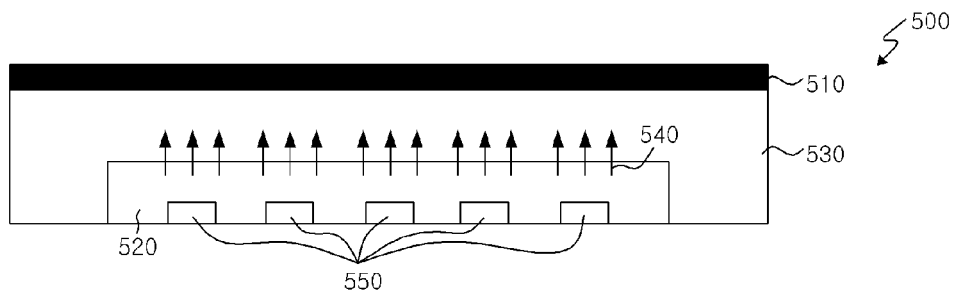
FIG. 5 illustrates a fingerprint recognition device including a light source according to another embodiment of the present invention.

FIG. 5 illustrates a fingerprint recognition device including a light source according to another embodiment of the present invention.

Referring to FIG. 5, the fingerprint recognition device 500 includes a fingerprint touch unit 510, an image sensor 520, and a light emitting unit 550. The fingerprint recognition device 500 is similar to the fingerprint recognition device 400 illustrated in FIG. 4 but has a difference from the fingerprint recognition device 400 in that the light emitting unit 550 is formed in the image sensor 520.

Figure 6:
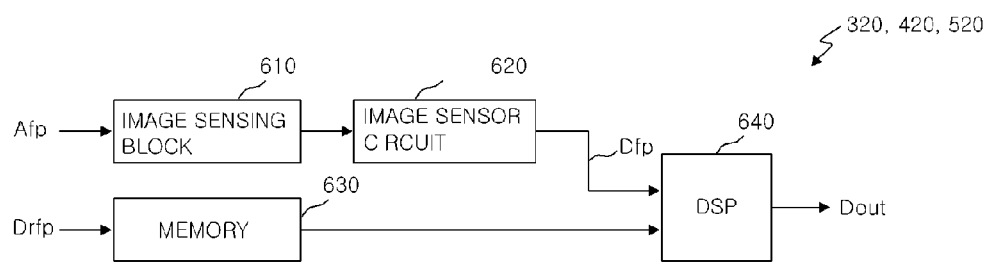
FIG. 6 is a block diagram illustrating the image sensor illustrated in FIG. 3, 4, or 5.

FIG. 6 is a block diagram illustrating the image sensor illustrated in FIG. 3, 4, or 5.

Referring to FIG. 6, the image sensor 320, 420, or 520 includes an image sensing block 610, an image sensor circuit 620, a memory, and a signal processing block 640.

The memory 630 stores the comparison reference fingerprint pattern Drfp that is a fingerprint of a card user. The image sensing block 610 converts a reflected wave transmitted from the fingerprint touch unit 310, 410, or 510, that is, a fingerprint image Afp into an electrical signal. The image sensor circuit 620 receives the electrical signal from the image sensing block 610 and captures the fingerprint image. The signal processing block 640 determines whether or not the captured fingerprint pattern Dfp output from the image sensor circuit 620 accords with the comparison reference fingerprint pattern Drfp read from the memory 630 and outputs a result Dout of the determination.

In FIG. 6, it is illustrated that the comparison reference fingerprint pattern Drfp is stored in the memory 630 compulsively. However, after a sensing signal generated by directly touching the image sensing block 610 with a finger of a user is captured by the image sensor circuit 620 and stored in the memory 630, the stored sensing signal may be used as the comparison reference fingerprint pattern Drfp. This function may be controlled by the signal processing block 640.

A fingerprint of a person may include five portions as follows.

1. Ridge: a long upper portion of a fingerprint like a mountain chain.
2. Valley: a depression resembling a valley between ridges.
3. Ending point: a portion where a ridge ends.
4. Bifurcation: a portion where a ridge splits.
5. Lift: a portion where three ridges join in three directions.

Since the ending point, the bifurcation, and the lift can be represented by using the ridges and valleys, hereinafter, only the terms ridges and valleys are used according to the present invention.

Figure 7:
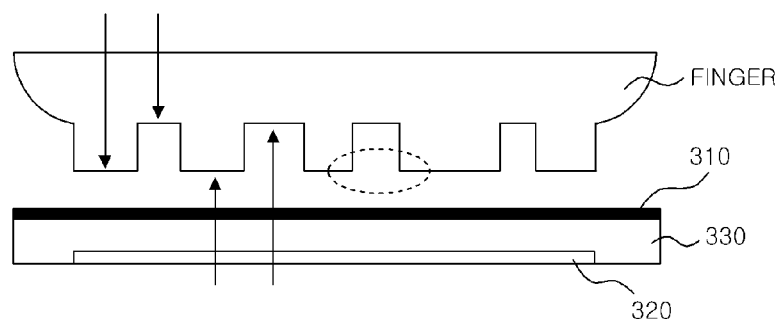
FIG. 7 illustrates a general shape of depths of valleys and ridges of a fingerprint.

FIG. 7 illustrates a general shape of depths of valleys and ridges of a fingerprint.

As described above, a fingerprint mainly includes valleys and ridges. Incident light forms reflected waves and refracted waves reflected and refracted from the valleys and ridges, and shapes of the reflected waves or the refracted waves of the valley and the ridge are different from each other. Referring to FIG. 7, a frequency of light incident from up or down has enough intensity to generate the reflected wave and the refracted wave. For example, a signal having an infrared frequency may pass through the finger and the substrate 330, 430, or 530.

Now, a case where a finger having a fingerprint to be recognized touches the fingerprint touch unit 310 of the fingerprint recognition device 300 according to embodiment of the present invention illustrated in FIG. 3 is described. The description may be applied to the fingerprint recognition devices 400 and 500 illustrated in FIGS. 4 and 5, respectively.

Referring to FIG. 7, when the finger touches the fingerprint touch unit 310 with a proper force, it can be seen that a shape of a fingerprint is properly maintained.

Figure 8:
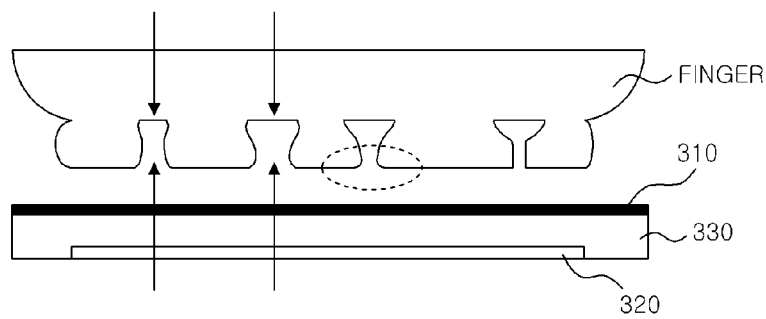
FIG. 8 illustrates shapes of depths of valleys and ridges of a fingerprint when a finger having the fingerprint to be recognized exerts a strong force.

FIG. 8 illustrates shapes of depths of valleys and ridges of a fingerprint when a finger having the fingerprint to be recognized exerts a strong force.

Referring to FIG. 8, when the finger touches the fingerprint touch unit 310 with a strong force, it can be seen that a shape of the fingerprint is distorted as compared with the general case illustrated in FIG. 7 However, excluding a case where an excessive force that is not predictable is exerted, although the finger exerts a certain amount of force, the shapes of the valleys and ridges of the fingerprint remain. Therefore, the fingerprint recognition device 300 according to the embodiment of the present invention may show significantly improved effects against an excessive pressure which is a problem that the pressure sensor 100 illustrated in FIG. 1 cannot overcome. In addition, the fingerprint recognition device 300 has a very low height (for example, within hundreds of micrometers) as compared with a height of the optical image sensor 200 illustrated in FIG. 2, so that the fingerprint recognition device 300 may satisfy basic conditions to be inserted into a card.

Figure 9:
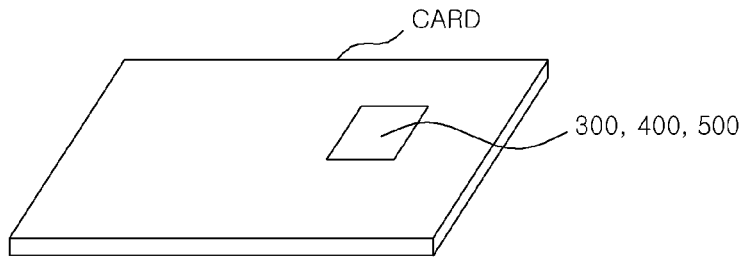
FIG. 9 illustrates an example of a credit card having a fingerprint recognition function.

FIG. 9 illustrates an example of a credit card having a fingerprint recognition function.

Referring to FIG. 9, a credit card includes the fingerprint recognition device 300, 400, or 500 for performing the fingerprint recognition function. As described above, the fingerprint recognition device 300, 400, or 500 according to the present invention has advantages in terms of pressure exerted on the finger and the thickness, so that the fingerprint recognition device 300, 400, or 500 can be inserted into the card that cannot apply the conventional fingerprint recognition device.

Although the fingerprint recognition device 300, 400, or 500 is illustrated to penetrate the card in FIG. 9, this is only an example, and the fingerprint recognition device 300, 400o, or 500 may be attached to a surface of the card. In this case, a surface of the fingerprint recognition device 300, 400, or 500 may be covered by an opaque insulating material that is the same as a material of the card. In addition, in a case where the fingerprint recognition device 300, 400, or 500 is provided to penetrate the card, a surface or both surfaces of the fingerprint recognition device 300, 400, or 500 may be covered by a transparent insulating material.

Figure 10:
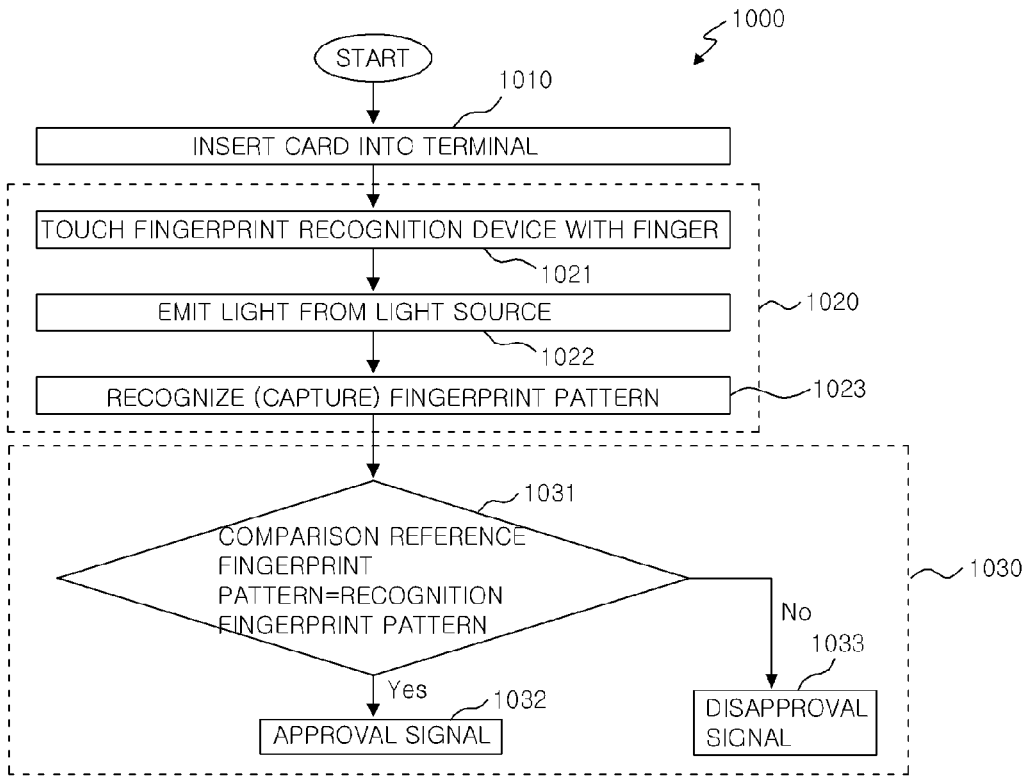
FIG. 10 is a flowchart of a method of authenticating a user of a card including the fingerprint recognition device as a genuine.

FIG. 10 is a flowchart of a method of authenticating a user of a card including the fingerprint recognition device as a genuine.

Referring to FIG. 10, the method of authenticating the user of the card as a genuine includes steps of inserting the card into a terminal (step 1010), capturing a fingerprint pattern input from the card (step 1020), and comparing the captured fingerprint pattern with a comparison reference fingerprint pattern (step 1030).

In the step of inserting the card into the terminal (step 1010), the card user inserts the card including the fingerprint recognition device into the card terminal connected to a card company or a bank on-line.

The step of capturing the fingerprint pattern input from the card (step 1020) includes steps of touching the fingerprint recognition device included in the card with a finger of the user (step 1021), emitting light having a predetermined frequency from a light source included in the fingerprint recognition device or a light source provided to an upper portion or a lower portion of the card terminal (step 1022), and capturing a fingerprint pattern generated by the light emitted from the light source (step 1023).

The step of comparing the captured fingerprint pattern with the comparison reference fingerprint pattern includes steps of comparing the comparison reference fingerprint pattern stored in the card with the captured fingerprint pattern to determine whether or not the two fingerprint patters accord with each other (step 1031), generating an approval signal when the two fingerprint patterns accord with each other (step 1032), and generating a disapproval signal when the two fingerprint patterns do not accord with each other (step 1033).

The card company or the bank provides a service requested from the card user through the card terminal when the approval signal is output from the card and does not provide any service when the disapproval signal is output.

As described above, the fingerprint recognition device, the card including the fingerprint recognition device, and the user authentication method using the card including the fingerprint recognition device do not use information such as a password and a resident registration number that can be easily leaked in real life but use a fingerprint that is determined as the most difficult thing to be reproduced, in order to perform an authentication process with the card company or the bank.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A fingerprint recognition device comprising:
   a fingerprint touch unit that a fingerprint touches; and
   an image sensor for capturing a fingerprint pattern by using a reflected wave reflected from the fingerprint touch unit, and for comparing a comparison reference fingerprint pattern with the captured fingerprint pattern,
   wherein the fingerprint touch unit and the image sensor are implemented on different surfaces of a semiconductor substrate, and
   wherein the image sensor includes:
      a memory for receiving and storing the comparison reference fingerprint pattern;
      an image sensing block for converting the reflected wave reflected from the fingerprint touch unit into an electrical signal;
      an image sensor circuit for receiving the electrical signal from the image sensing block, and for capturing the fingerprint pattern; and
      a signal processing block for determining whether or not the captured fingerprint pattern and the comparison reference fingerprint pattern accord with each other, and for outputting a result of the determination.

2. The device of claim 1, wherein the fingerprint touch unit is implemented by a surface grinding process in semiconductor manufacturing processes.

3. The device of claim 1, wherein the memory stores a fingerprint pattern captured by using the image sensing block and the image sensor circuit as the comparison reference fingerprint pattern, or externally receives and stores a fingerprint pattern as the comparison reference fingerprint pattern.

4. The device of claim 1, wherein the reflected wave reflected from the fingerprint touch unit is generated from a light source emitted in a direction from an upper portion of the fingerprint touch unit or an upper portion of the image sensor toward the fingerprint touch unit.

5. The device of claim 1, further comprising a light emitting unit.

6. The device of claim 5, wherein light emitted from the light emitting unit has an infrared frequency.

7. The device of claim 6, wherein the light emitting unit includes one or more light-emitting diodes.

8. The device of claim 7, wherein the light emitting unit is implemented in the semiconductor substrate along with the fingerprint touch unit and the image sensor or implemented in the image sensor.

* * * * *